United States Patent
Tsutsumi

(10) Patent No.: US 8,953,184 B2
(45) Date of Patent: Feb. 10, 2015

(54) PROCESSING APPARATUS, PROCESSING SYSTEM, AND NON-TRANSITORY COMPUTER READABLE MEDIUM

(71) Applicant: Fuji Xerox Co., Ltd., Tokyo (JP)

(72) Inventor: Kenji Tsutsumi, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/625,419

(22) Filed: Sep. 24, 2012

(65) Prior Publication Data

US 2013/0176583 A1    Jul. 11, 2013

(30) Foreign Application Priority Data

Jan. 11, 2012  (JP) ................................. 2012-003169

(51) Int. Cl.
  *G06F 3/12*  (2006.01)
  *G06K 15/00*  (2006.01)

(52) U.S. Cl.
  USPC ........................ 358/1.13; 358/1.14; 358/1.15

(58) Field of Classification Search
  CPC ........ G06K 15/02; G06K 15/40; G06K 15/22
  See application file for complete search history.

(56) References Cited

U.S. PATENT DOCUMENTS

2009/0303537 A1* 12/2009 Matsumoto ................. 358/1.15
2011/0047261 A1* 2/2011 Gobara et al. ............... 709/224
2011/0063646 A1* 3/2011 Maeda ........................ 358/1.13

FOREIGN PATENT DOCUMENTS

JP    A-8-263283    10/1996
JP    A-2005-025616    1/2005

* cited by examiner

*Primary Examiner* — Fred Guillermety
*Assistant Examiner* — Henok A Shiferaw
(74) *Attorney, Agent, or Firm* — Oliff PLC

(57) ABSTRACT

A processing apparatus includes a provision unit that is connected to a communication unit used to communicate with plural actual apparatuses and a manipulation unit which is used to manipulate the actual apparatuses, that forms virtual image processing functions which control operations of the actual apparatuses based on manipulation of the manipulation unit, and that provides services using the virtual image processing functions, and a control unit that, when an operation execution instruction of the actual apparatuses is given using the manipulation unit, limits the processes which exceed an amount of licenses indicating a previously contracted number of actual apparatuses, throughputs of the previously contracted number of actual apparatuses, or a previously contracted number of virtual image processing functions, and that controls the provision unit such that the services are provided based on the operation execution instruction.

6 Claims, 19 Drawing Sheets

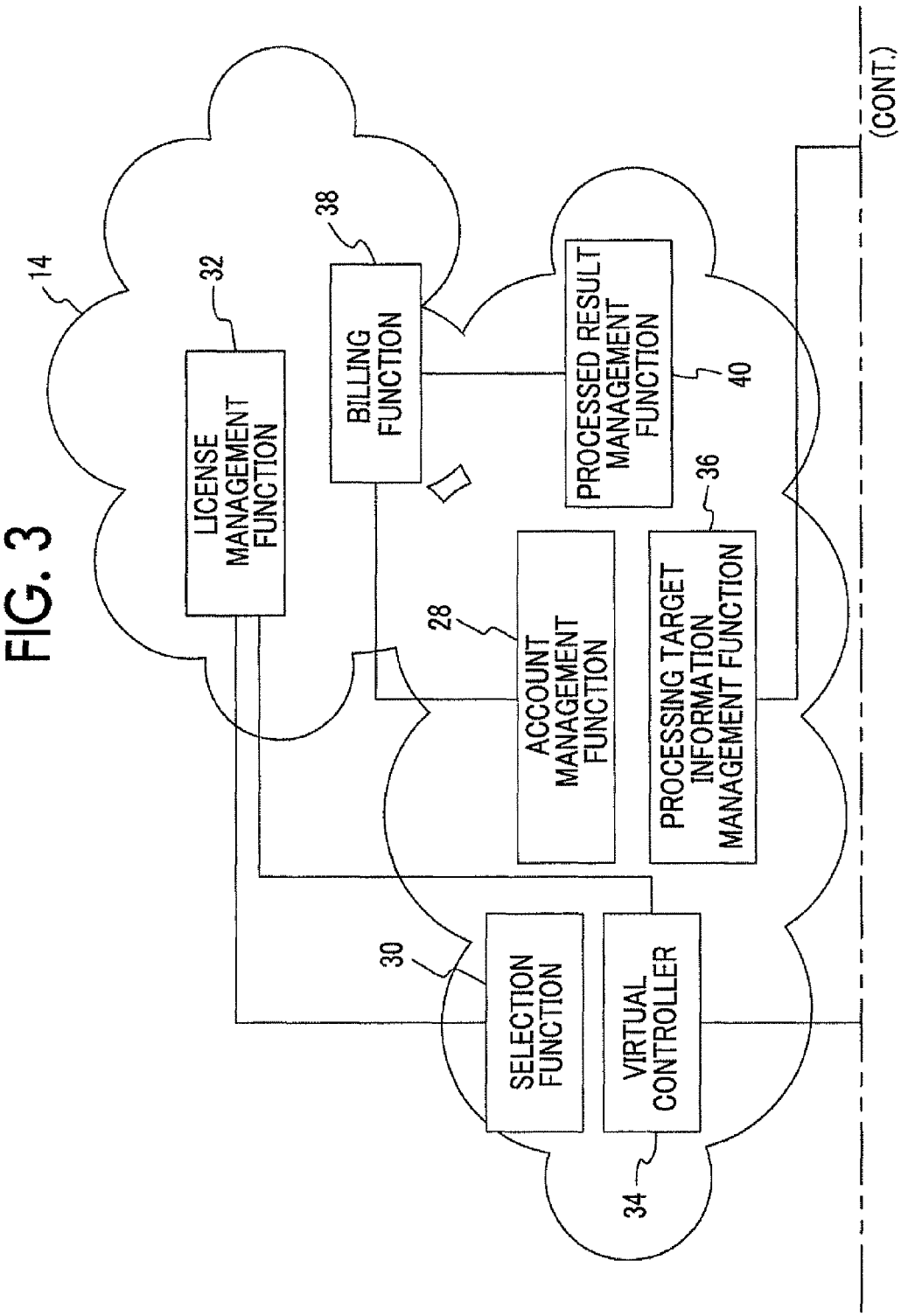

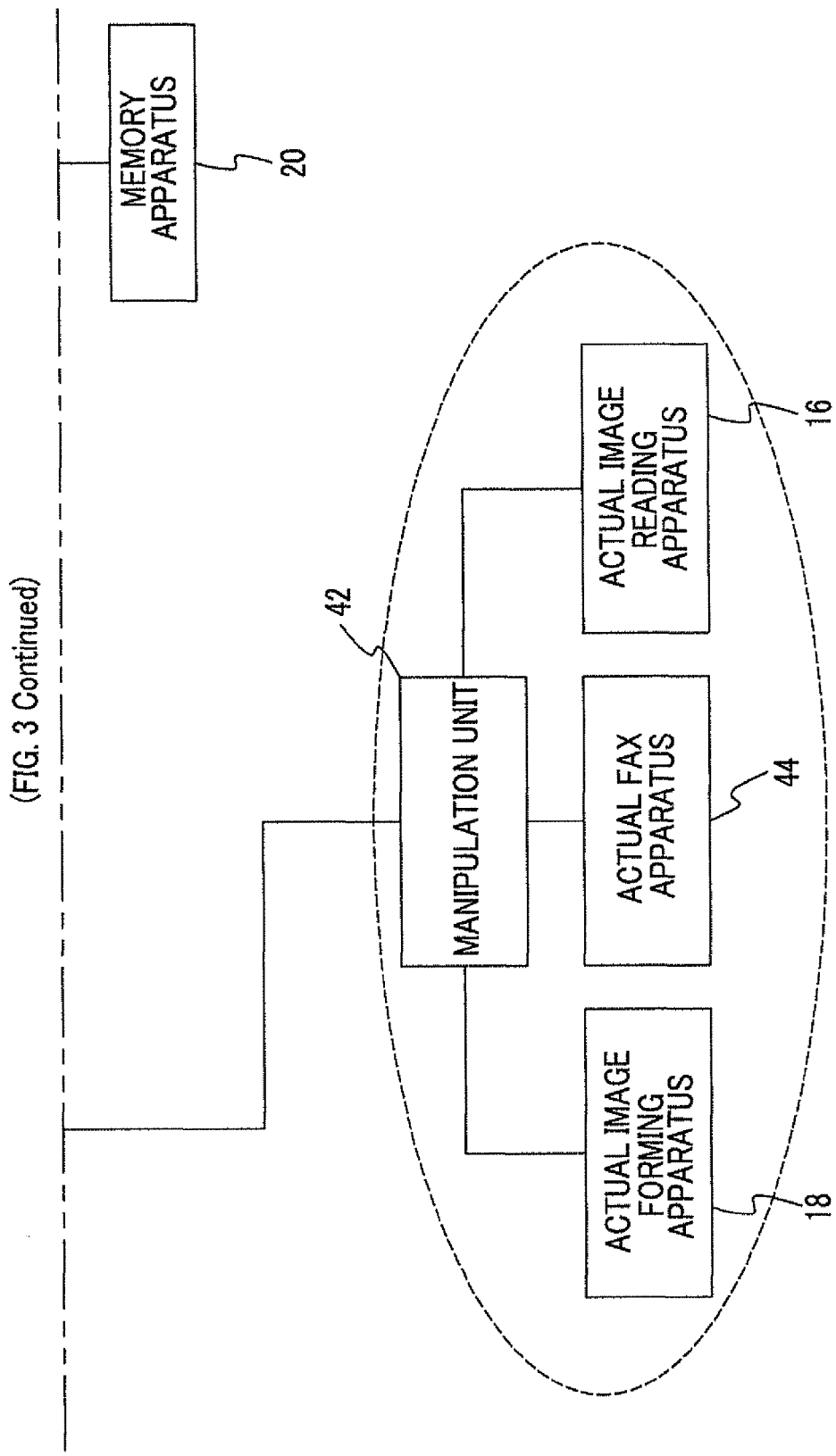

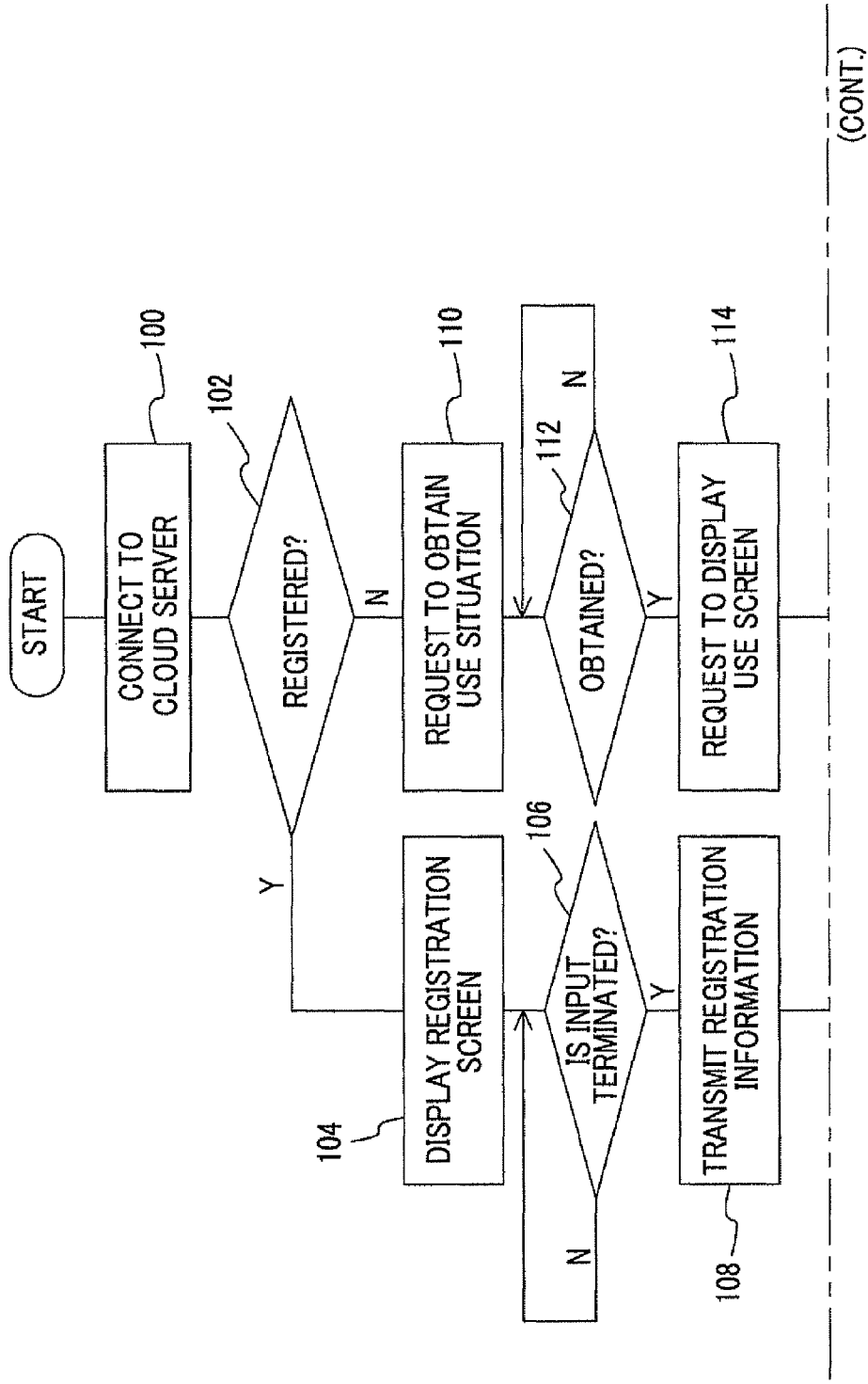

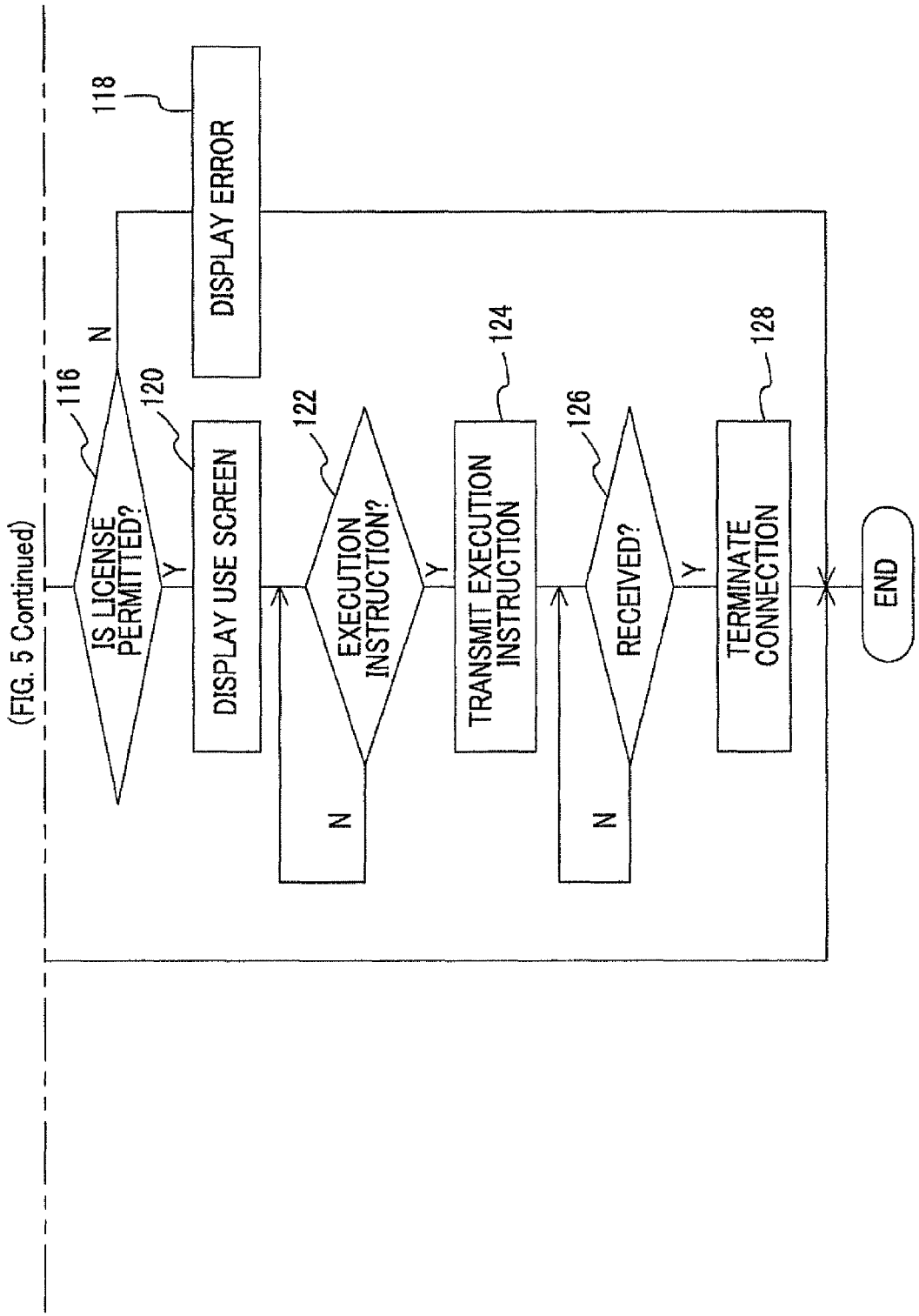

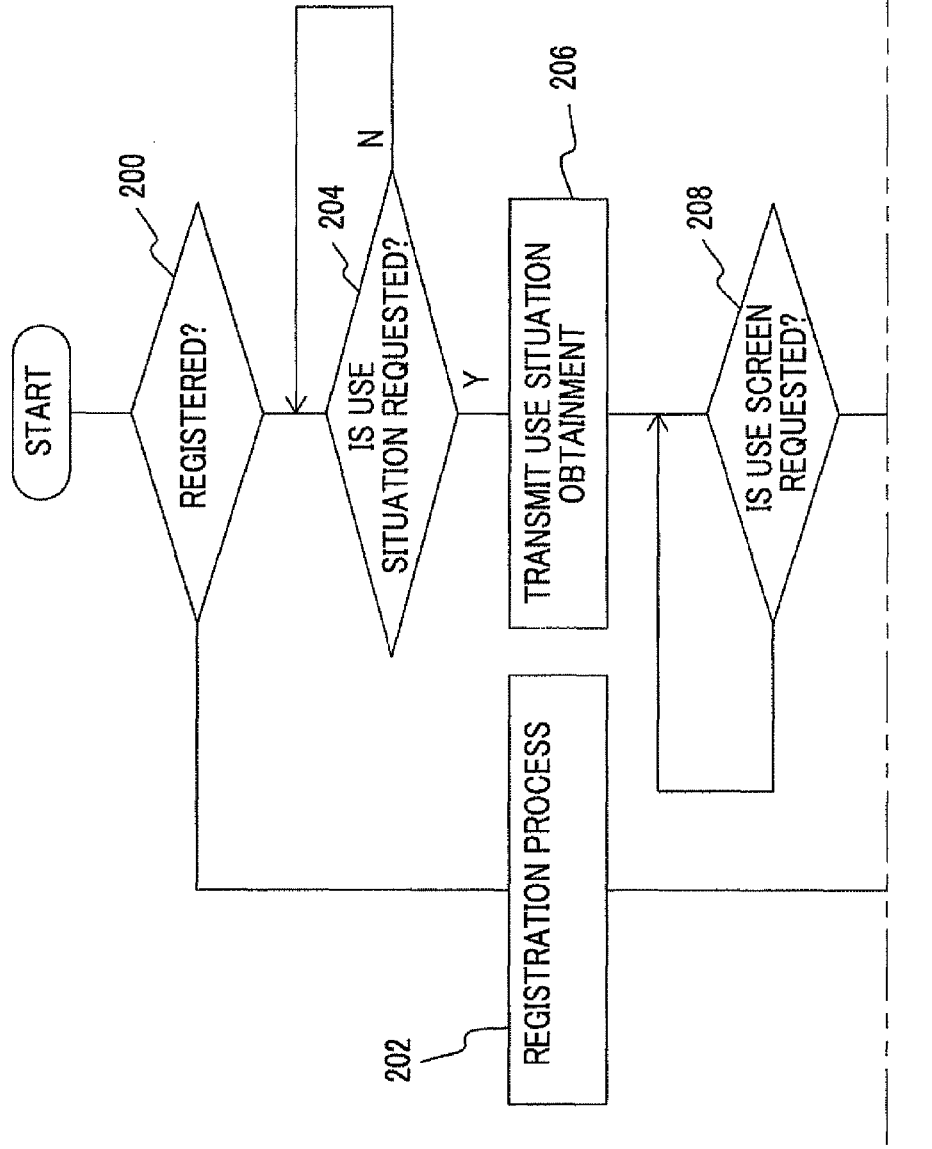

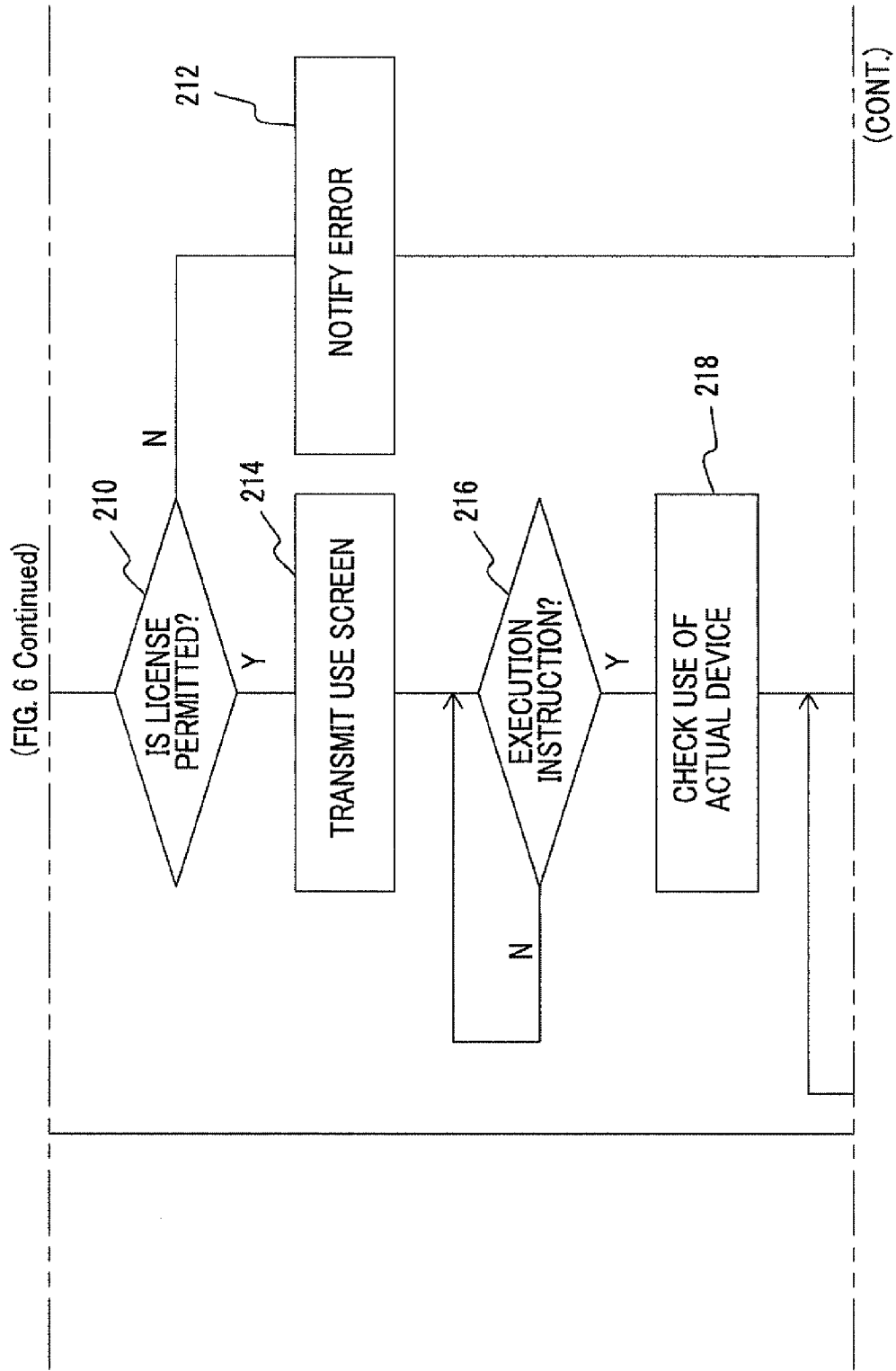

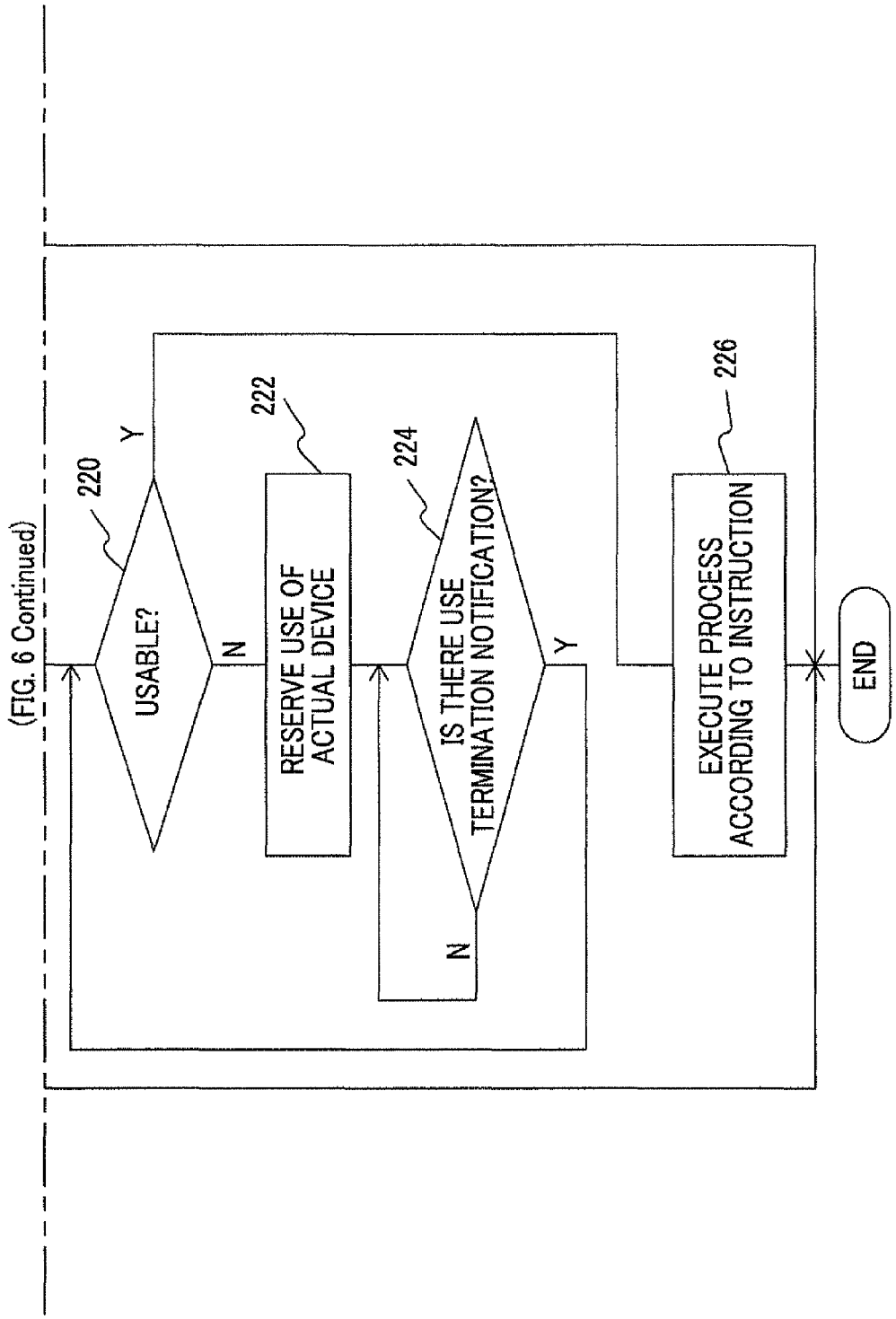

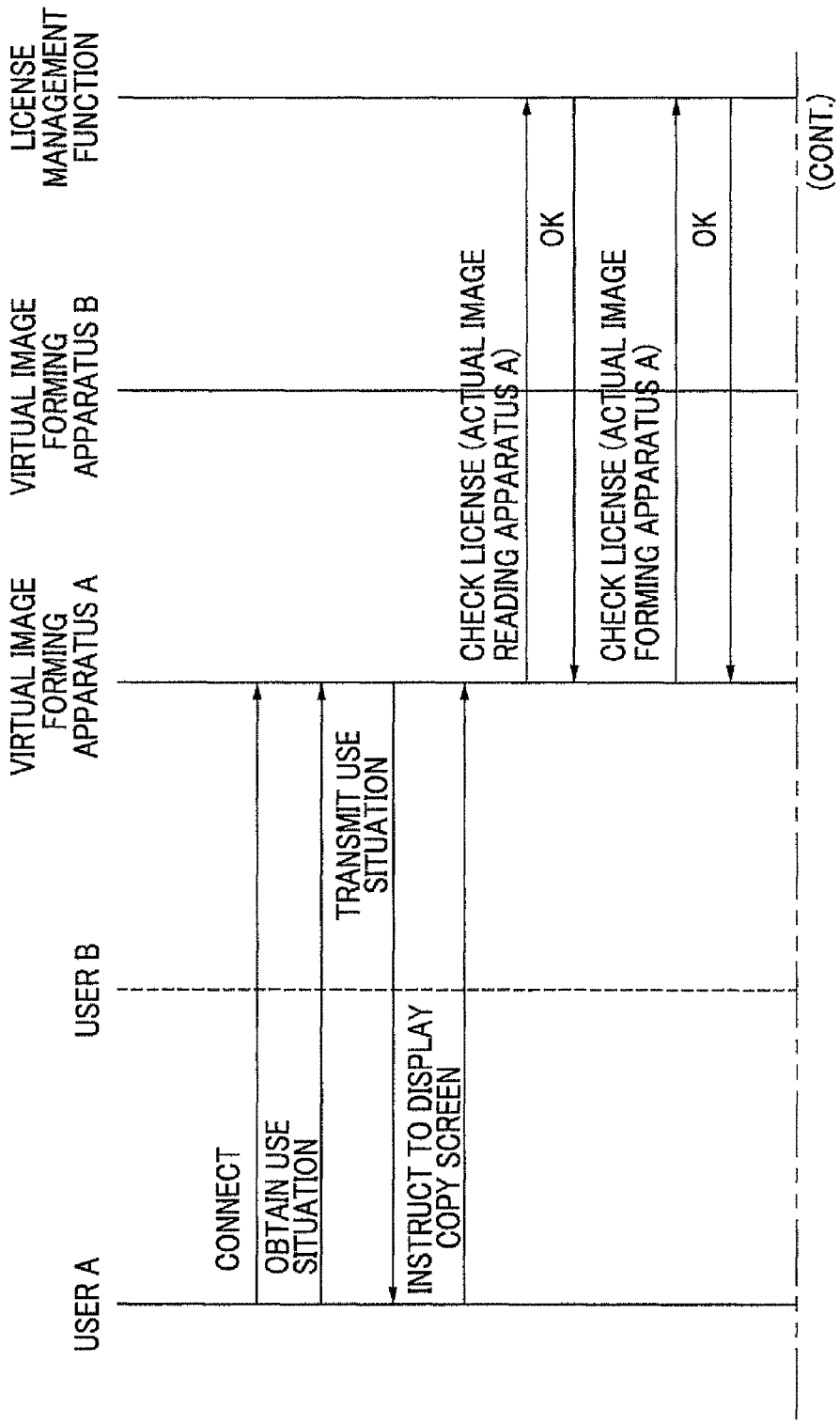

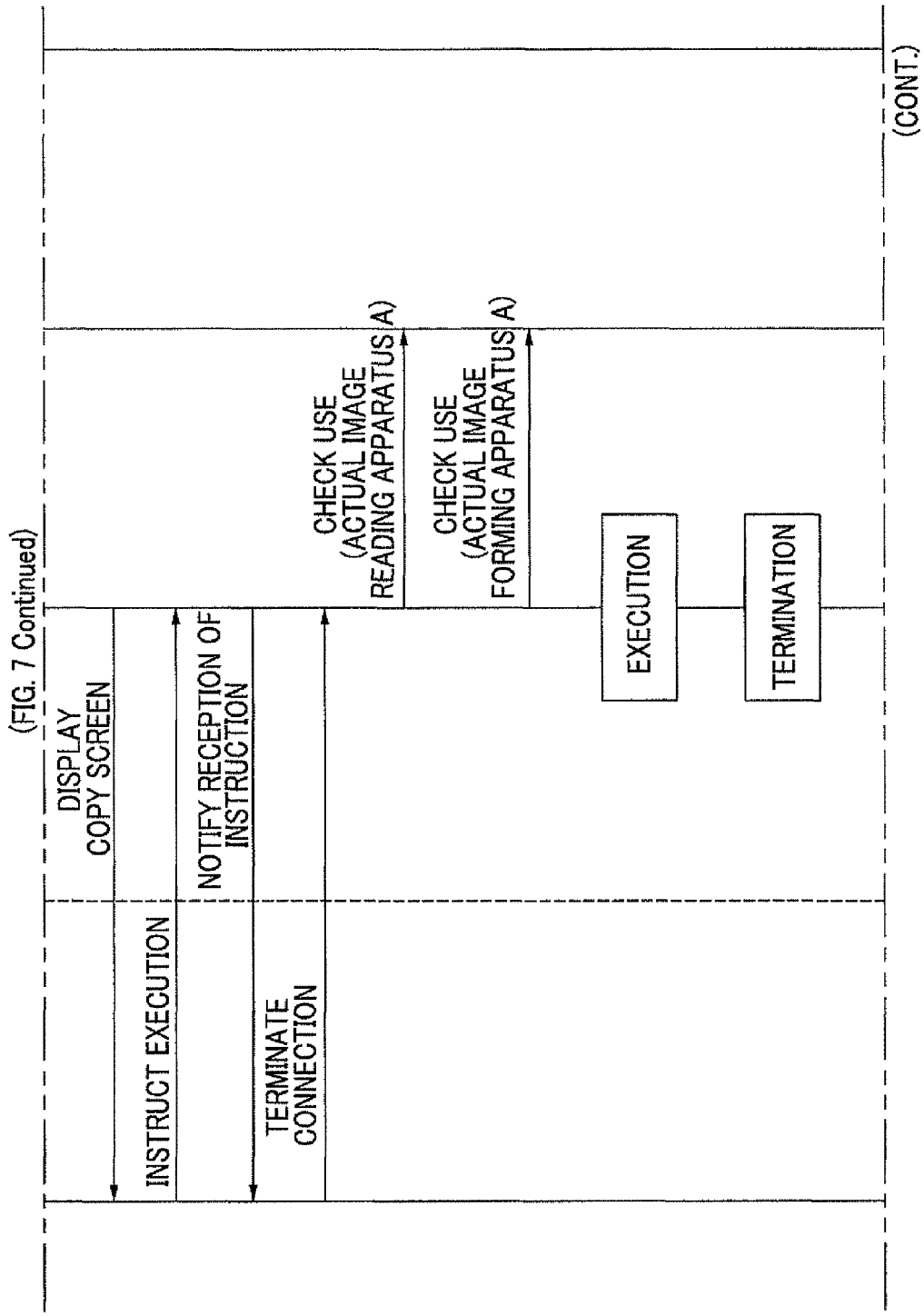

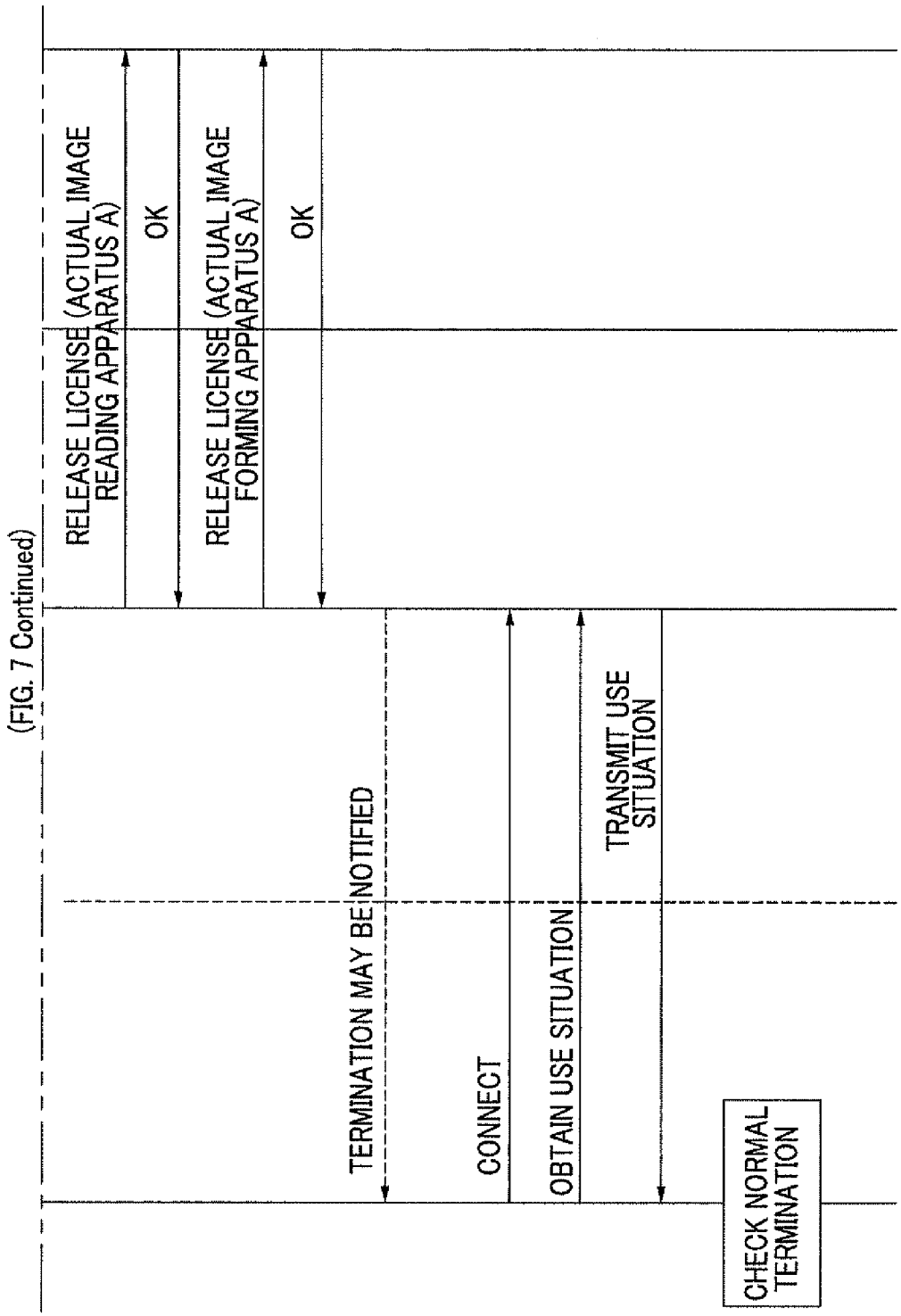

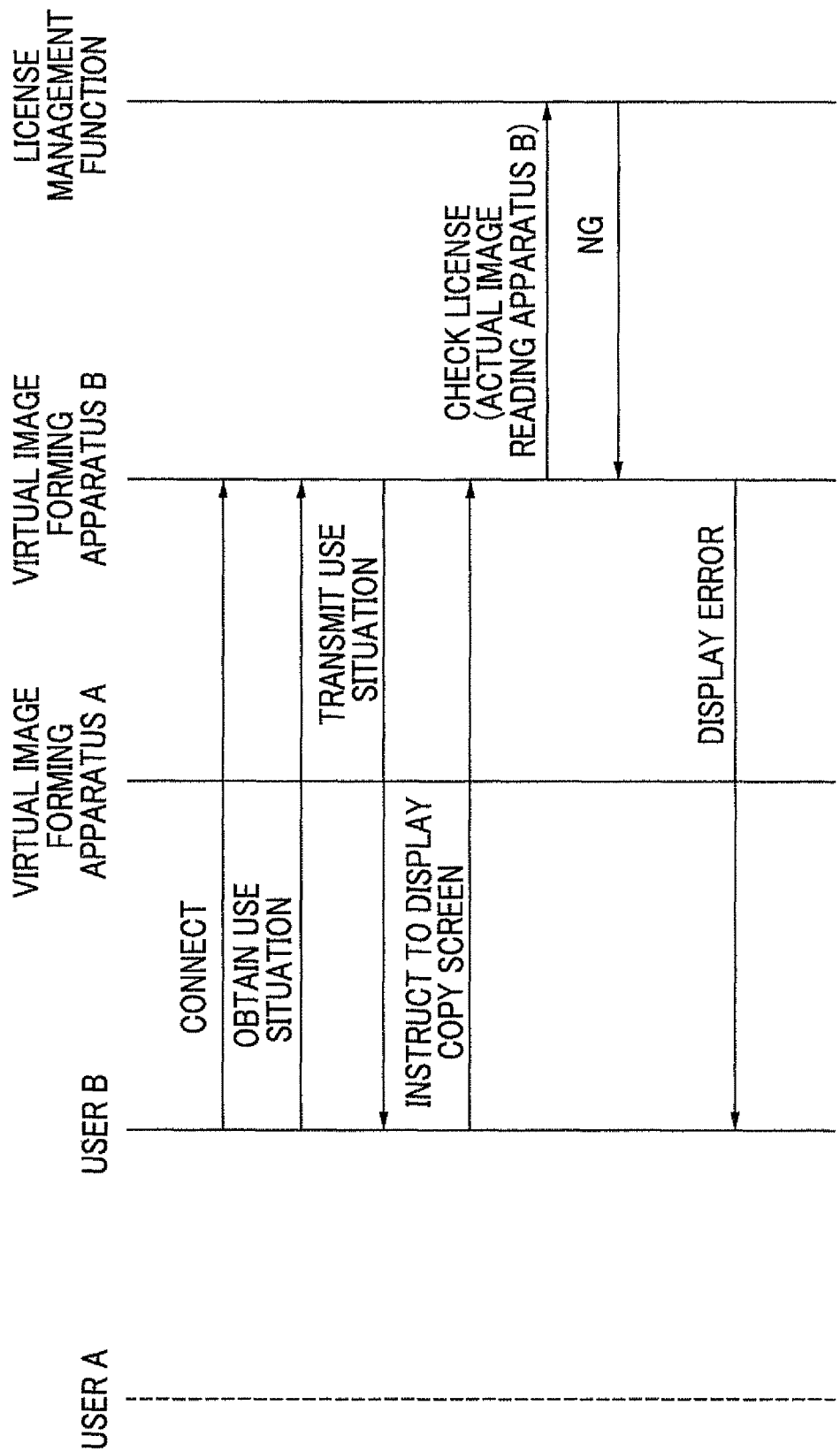

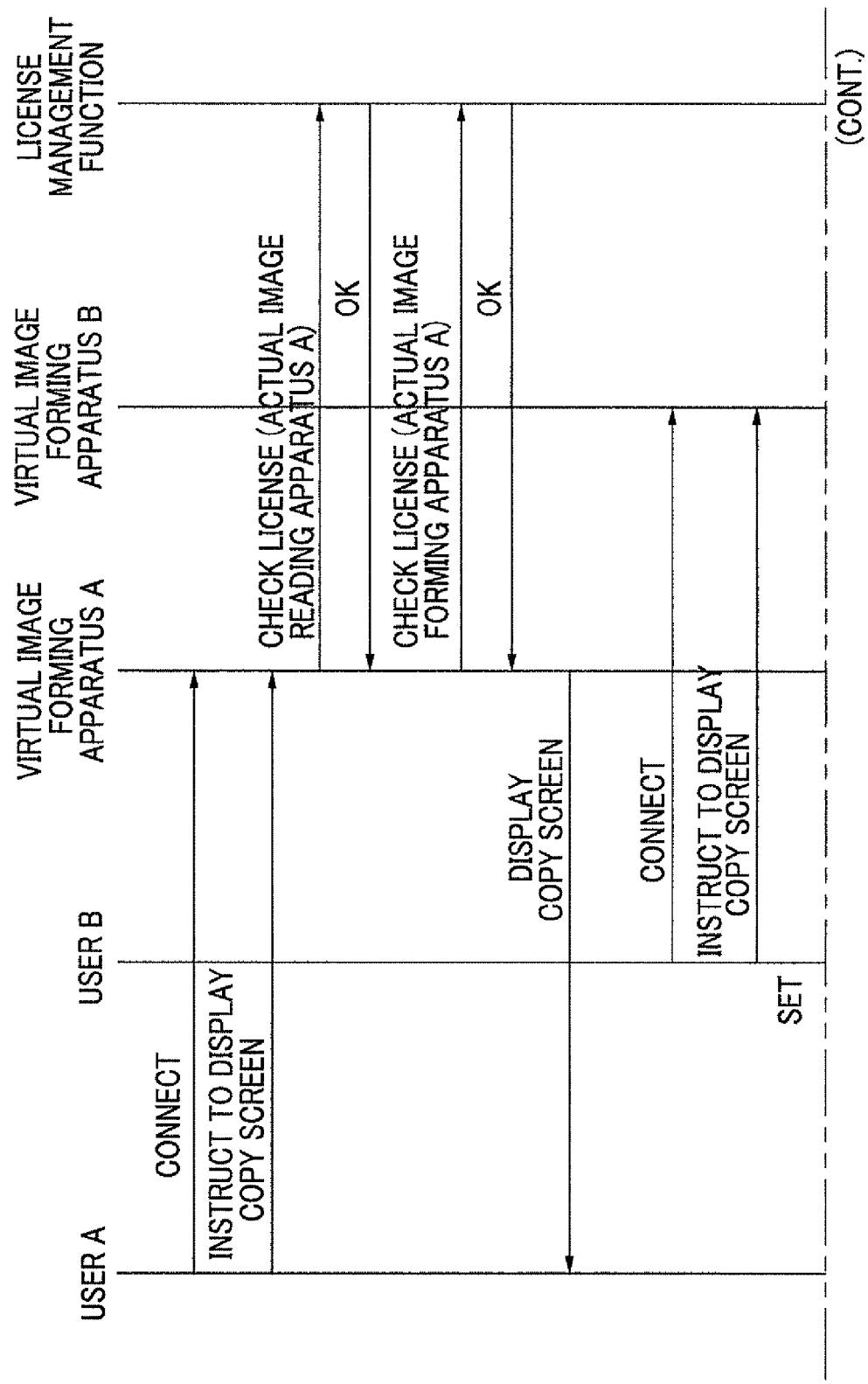

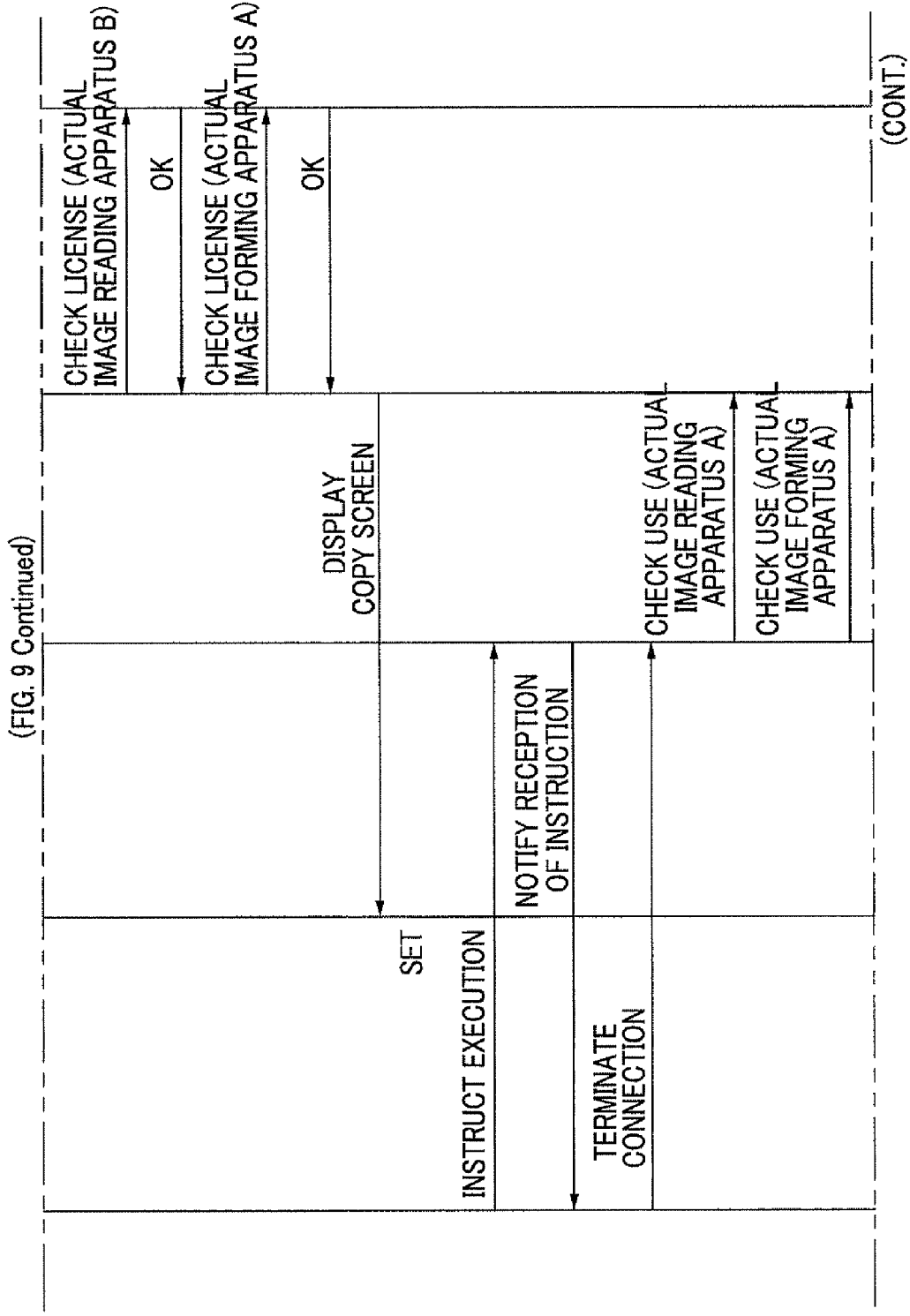

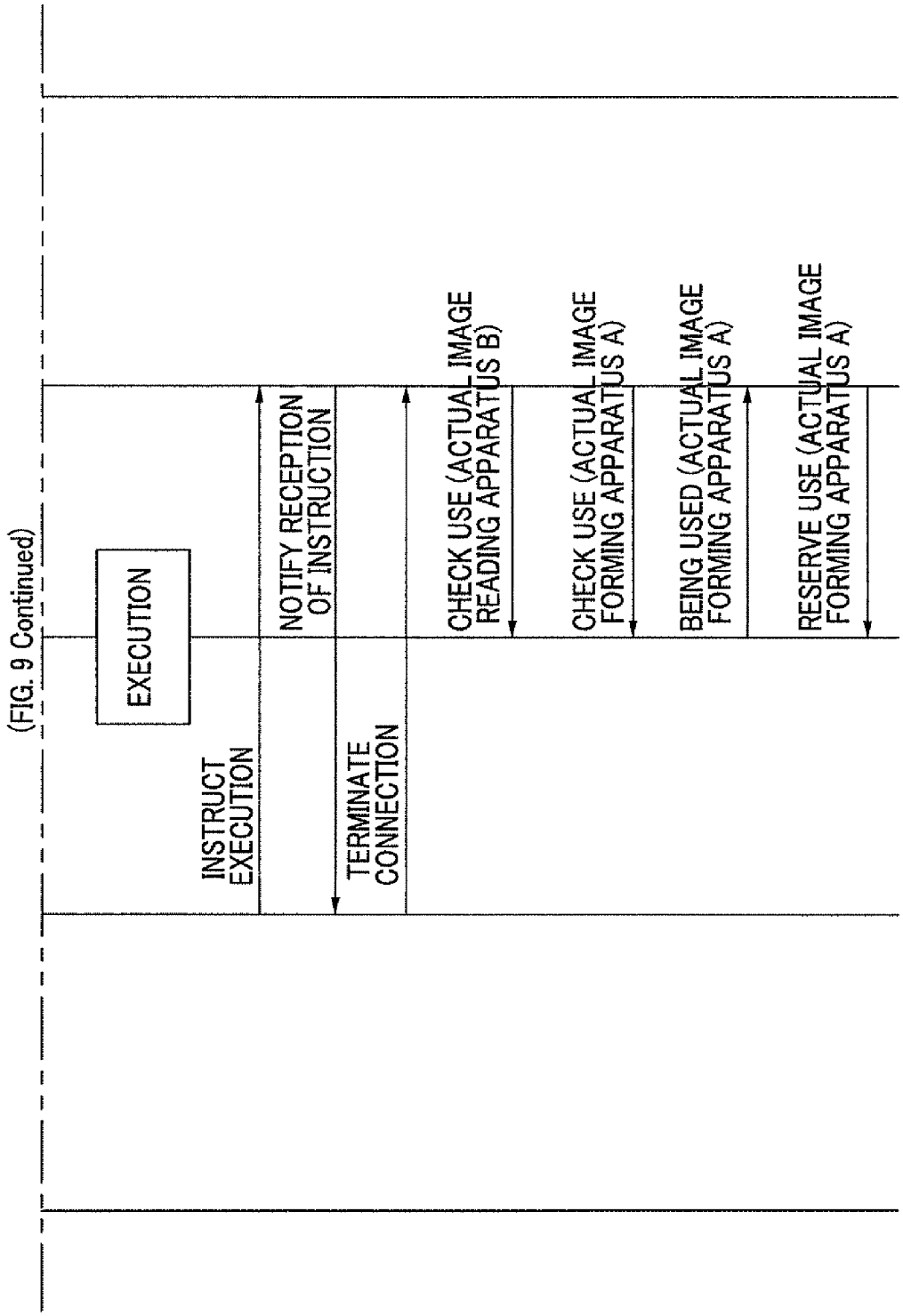

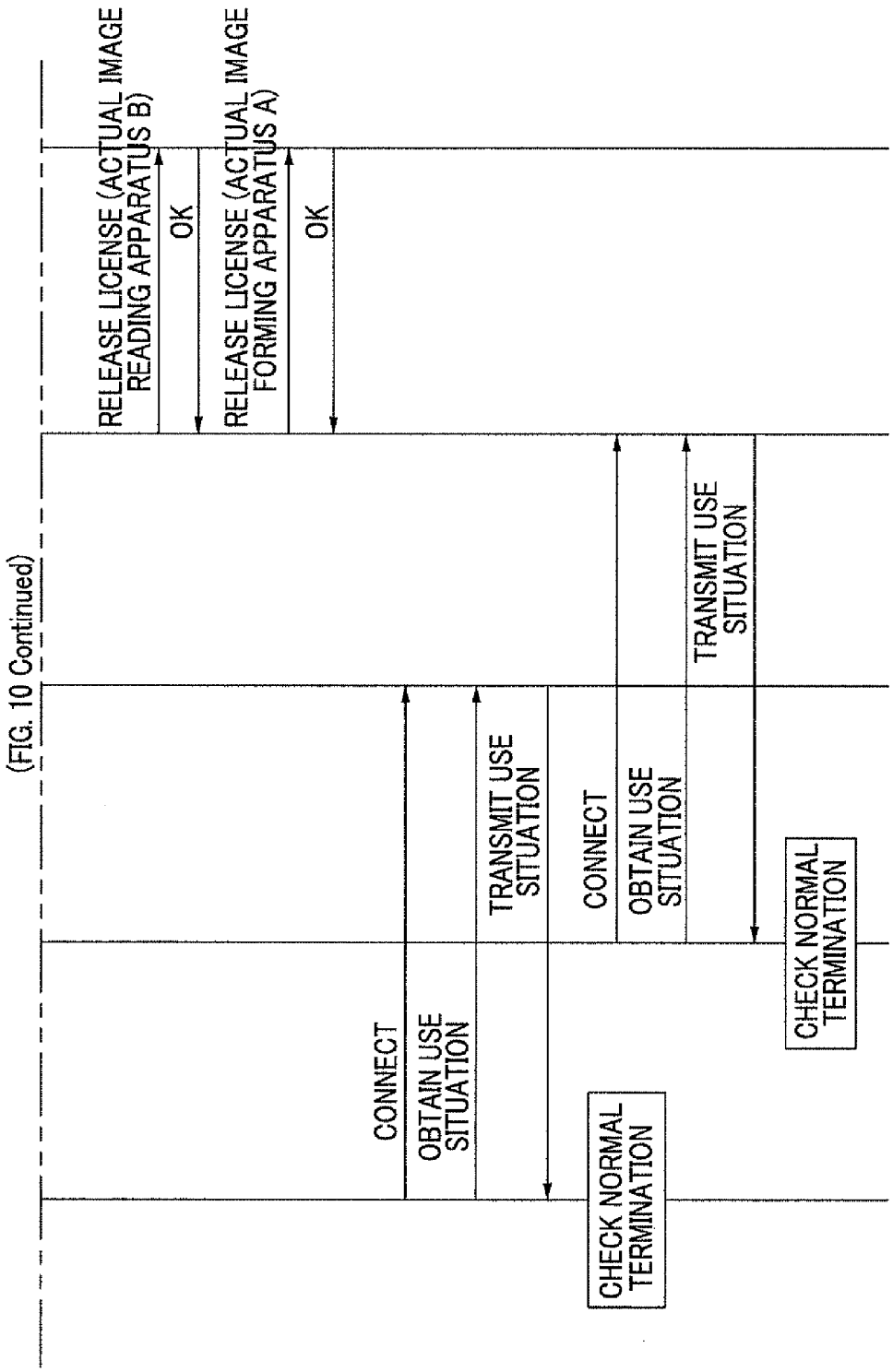

PROCESSING APPARATUS, PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-003169 filed Jan. 11, 2012.

BACKGROUND (i) Technical Field

The present invention relates to a processing apparatus, a processing system, and a non-transitory computer readable medium.

(ii) Related Art

An image forming apparatus is generally connected to communication unit, such as a network, to which a server or a client computer is connected, and used.

A server network system in which plural terminal apparatuses are connected to a communication unit, such as a Local Area Network (LAN), has been widely used.

SUMMARY

According to an aspect of the invention, there is provided a processing apparatus including: a provision unit that is connected to a communication unit used to communicate with plural actual apparatuses which perform previously determined processes and a manipulation unit which is used to manipulate the actual apparatuses, that forms virtual image processing functions which control operations of the actual apparatuses based on manipulation of the manipulation unit, and that provides services using the virtual image processing functions; and a control unit that, when an operation execution instruction of the actual apparatuses is given using the manipulation unit via the communication unit, limits the processes which exceed an amount of licenses indicating a previously contracted number of actual apparatuses which may be executed at the same time, throughputs of the previously contracted number of actual apparatuses which may be executed at the same time, or a previously contracted number of virtual image processing functions which may be executed at the same time, and that controls the provision unit such that the services are provided based on the operation execution instruction.

BRIEF DESCRIPTION OF THE DRAWINGS

Exemplary embodiments of the present invention will be described in detail based on the following figures, wherein:

FIG. 3 is a functional block diagram illustrating the function of the cloud server 14 of a virtual image processing system 10 (in a case in which actual devices correspond to the respective functions of an image generation apparatus with multiple functions) according to an exemplary embodiment of the present invention;

FIG. 5 is a flowchart illustrating an example of the flow of a process performed using the manipulation unit or a computer of the virtual image processing system according to the exemplary embodiment of the present invention;

FIG. 6 is a flowchart illustrating an example of the flow of a process performed using the cloud server of the virtual image processing system according to the exemplary embodiment of the present invention;

FIG. 7 is a timing chart illustrating an example of an operation performed when a user A uses the copy service of a virtual image processing apparatus A in the virtual image processing system according to the exemplary embodiment of the present invention;

FIG. 8 is a timing chart illustrating an example of an operation performed when a user B tries to use the copy service of a virtual image processing apparatus B and there is an insufficient number of licenses in the virtual image processing system according to the exemplary embodiment of the present invention;

FIG. 9 is a timing chart illustrating an example of (the first half of) an operation performed when the user A and the user B use the same actual device with different virtual image processing apparatuses in the virtual image processing system according to the exemplary embodiment of the present invention.

DETAILED DESCRIPTION

Figure 1:
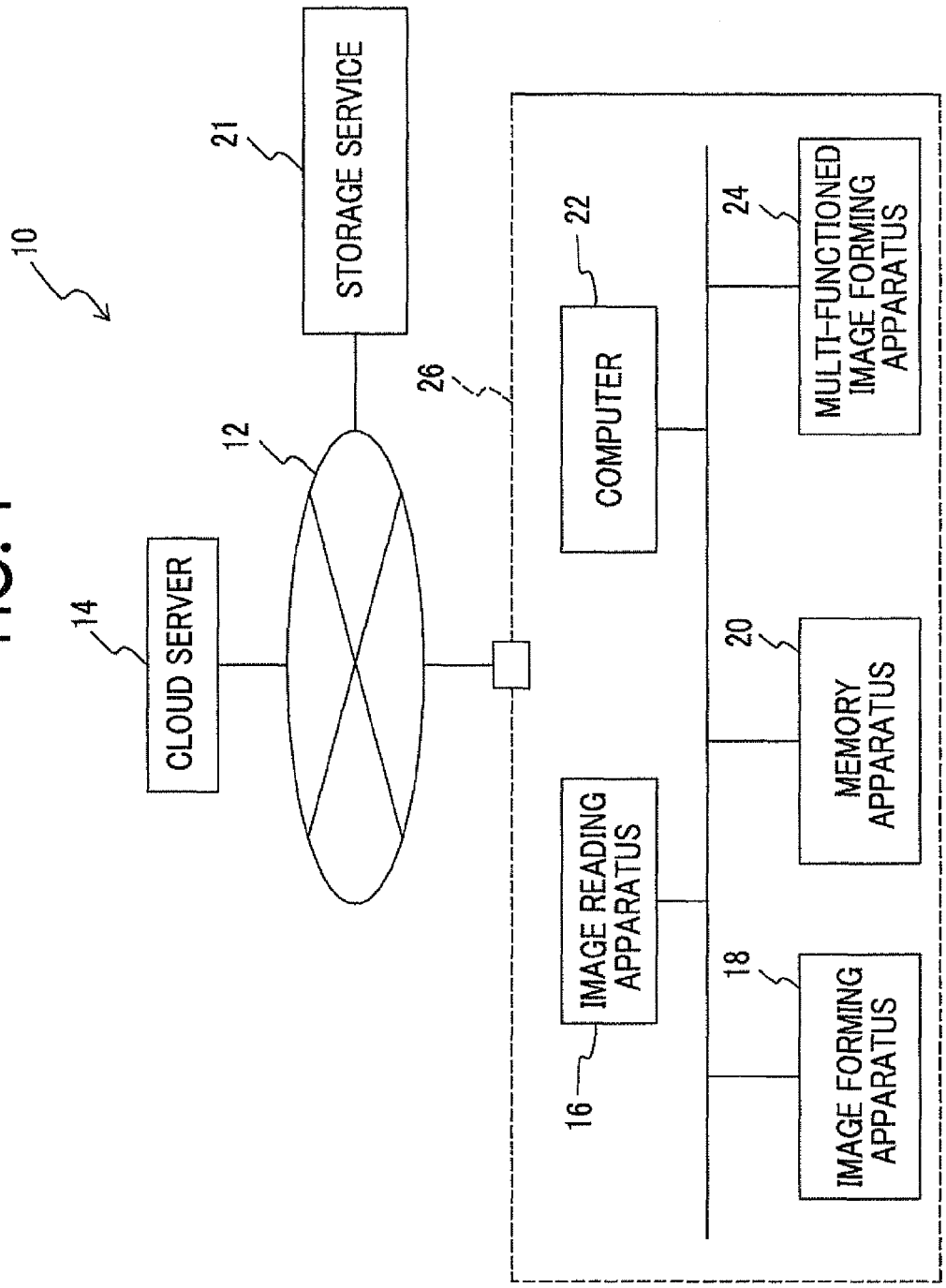
FIG. 1 is a block diagram illustrating the schematic configuration of a virtual image processing system according to an exemplary embodiment of the present invention.

Hereinafter, examples of exemplary embodiments of the present invention will be described in detail with reference to the accompanying drawings. FIG. 1 is a block diagram illustrating the schematic configuration of a virtual image processing system according to an exemplary embodiment of the present invention.

A virtual image processing system 10 according to an exemplary embodiment of the present invention is connected to a cloud server 14 and actual devices, such as an image reading apparatus 16, an image forming apparatus 18, a memory apparatus 20, a computer 22, and a multi-functioned image forming apparatus 24 (an image forming apparatus, which includes at least two or more multiple functions, of an image reading apparatus, an image forming apparatus, and a Facsimile (FAX) apparatus) via communication unit 12 such as the Internet, and is configured to form a virtual image processing apparatus on the cloud server 14 and to provide a previously determined service. That is, the virtual image processing system 10 configures a so-called cloud computing system.

The actual devices, such as the image reading apparatus 16, the image forming apparatus 18, the memory apparatus 20, the computer 22, and the multi-functioned image forming apparatus 24, are connected to each other, and configure a LAN (Local Area Network) 26. Meanwhile, hereinafter, in order to distinguish the actual devices from virtual devices, the actual devices may be called in such a way as to add "actual" such as an actual image reading apparatus 16 or the actual image forming apparatus 18. In addition, other apparatuses (for example, the FAX apparatus) may be included as the actual devices.

Figure 2:
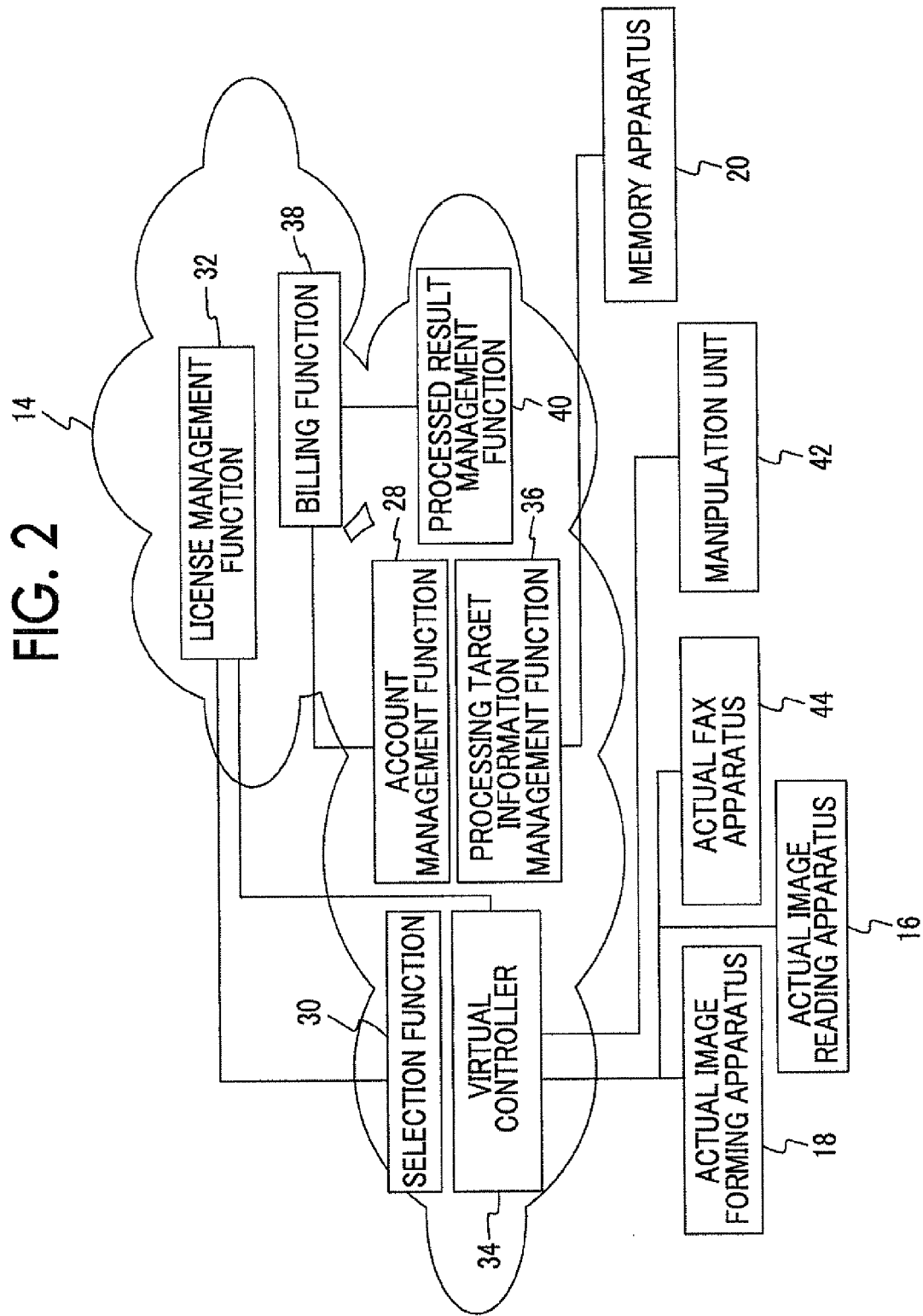
FIG. 2 is a functional block diagram illustrating the function of the cloud server 14 of a virtual image processing system 10 (in a case of plural actual devices) according to an exemplary embodiment of the present invention.

FIGS. 2 and 3 are functional block diagrams illustrating the functions of the cloud server 14 of the virtual image processing system 10 according to the exemplary embodiment of the present invention. Meanwhile, FIG. 2 illustrates an example in which plural actual devices are connected as the clients of the cloud server 14, and FIG. 3 illustrates an example in which a multi-functioned image forming apparatus is connected as the client of the cloud server 14.

The cloud server 14 includes an account management function 28, a selection function 30, a license management function 32, a virtual controller 34, a processing target information management function 36, a billing function 38, and a processed result management function 40 as shown in FIGS. 2 and 3.

The virtual controller 34 registers the names of virtual image processing apparatuses included in the cloud server 14 and information about actual devices (for example, an IP (Internet Protocol) address) which are used as the corresponding virtual image processing apparatuses, and manages the names and information. For example, a user connects to the cloud server 14 via the communication unit 12 and registers the name of a new virtual image processing apparatus and an actual device to be used. Or, a manager may register plural virtual image processing apparatuses in advance and the virtual image processing apparatuses may be selected when the virtual image processing apparatuses are used. Meanwhile, as shown in FIGS. 2 and 3, the account management function 28 may be provided and information about a user, who may use the virtual controller 34, for example, a user Identification (ID) and a password, may be registered.

Figure 4:
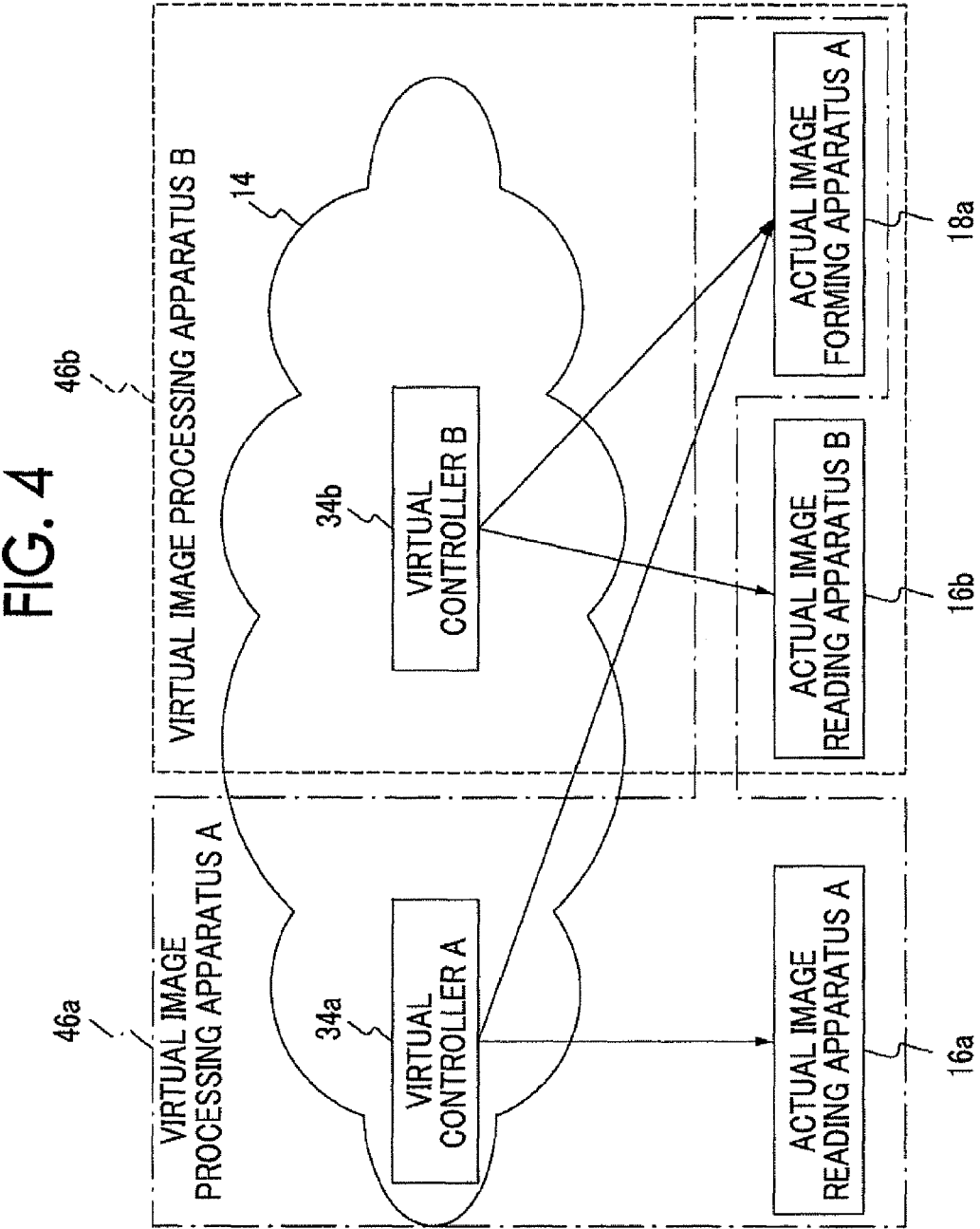
FIG. 4 is a diagram illustrating an example in which two virtual image processing apparatuses share a common actual device.

The registration of virtual image processing apparatuses into the cloud server 14 may be performed without limitation or virtual image processing apparatuses may be registered up to a previously determined limiting value A. A single actual device may be set to a virtual image processing apparatus, or, as shown in FIG. 2, each of the actual image reading apparatus 16, the actual image forming apparatus 18, and the actual FAX apparatus 44 may be set one by one. Meanwhile, when the multi-functioned image forming apparatus 24 is connected to the cloud server 14 (FIG. 3), the IP addresses of the actual image reading apparatus 16, the actual image forming apparatus 18, and the actual FAX apparatus 44 are the same. In addition, plural image processing apparatuses may share a single actual device. For example, as shown in FIG. 4, a virtual image processing apparatus A46a may include an actual image reading apparatus A16a and an actual image forming apparatus A18a; and a virtual image processing apparatus B46b may include an actual image reading apparatus B16b and the actual image forming apparatus A18a; thus the actual image forming apparatus A18a is shared by two virtual image processing apparatuses.

The virtual image processing apparatus included in the cloud server 14 may set information about the installation locations of the actual devices, the throughputs (color of black and white, an image reading and image forming speed, and a finishing function in the case of an image forming apparatus) of the actual devices. These pieces of information may be obtained from the actual devices, may be set by a manager, or may be obtained from the actual devices and the shortage thereof may be input by the manager.

The selection function 30 is used to select a virtual image processing apparatus to be used from registered virtual image processing apparatuses. For example, a user connects to the cloud server 14 via the communication unit 12 by operating a manipulation unit 42, such as a computer 22 or an actual device, displays a list of registered virtual image processing apparatuses, and selects a desired virtual image processing apparatus. At this time, the IP address, the installation location, or the throughput of an actual device may be displayed.

In addition, the selection function 30 requests a use license (use permission) from an actual device included in the selected virtual image processing apparatus. In detail, the selection function 30 requests the start of use of the actual device from the license management function 32.

The license management function 32 previously makes a contract about the number of actual devices which may be used at the same time, permits the contracted number of actual devices which may be used at the same time to be used as a limiting value B (limiting value A>limiting value B), and manages the use permissions (licenses) of the actual devices such that the actual devices, the number of which is equal to or greater than the contracted number, are prevented from being used at the same time. For example, if a contract is made in such a way that the number of actual image forming apparatuses 18 which may be used at the same time is 10, only 10 image forming apparatuses are permitted to perform an image forming process at the same time even when 100 actual image forming apparatuses 18 are connected to the communication unit 12. In addition, if the process of an arbitrary image forming apparatus 18 is terminated, the process of another image forming apparatus 18 may start.

Meanwhile, a license control range is a range in which an actual device is being operated (in the case of the actual image forming apparatus 18, a period that image forming is performed on paper), and a period that setting is being made in order to use the actual device is not included.

In addition, a license may be set for each actual device (the actual image forming apparatus 18, the actual image reading apparatus 16, or the actual FAX apparatus 44).

In detail, the license management function 32 examines actual devices which are currently used. If the use of the same actual device is permitted, the use of the actual device is permitted (after 1 is added to the number of uses) without changing the number of used licenses. In a state in which the use of the same actual device is not permitted, the number of used licenses is checked. If a license remains, the actual device is registered as a device, the use of which is permitted (the number of uses is set to 1), and the use of the actual device is permitted after 1 is subtracted from the number of used licenses. If a license does not remain, the use of the actual device is not permitted.

Further, in addition to the function of permitting a license (the function of issuing a license), the license management function 32 includes a function of reserving a license when a license is not permitted if the number of licenses exceeds the number of licenses which may be used at the same time, a function of issuing a license when the use of an actual device is terminated, and a function of reserving a license without issuing the license when the license of an actual device which is being used is requested in the state in which the license is reserved.

In addition, in the exemplary embodiment, the license management function 32 has been described as a function which regards the previously contracted number of actual devices which may be used at the same time of the amount of licenses and which suppresses a service which exceeds the amount of licenses. However, the amount of licenses may be managed using the sum of the throughputs (an image forming speed, an image reading speed, and a four times increase in a case of color) of actual devices, may be managed using the amount of totally used electricity, may be managed using the number of processable dots per unit time, may be managed using the amount of post-processing which may be used at the same time (for example, the number of staples or the number of punches), may be managed using the throughput of the virtual controller 34 (for example, the occupation capacity of a storage region), or may be managed by combining at least two or more of these.

In addition, if the number of uses of the actual devices is permitted using the license management function 32, the above-described selection function 30 notifies the virtual controller 34 of the virtual image processing apparatus of the information about the selected virtual image processing apparatus.

The virtual controller 34 transmits a manipulation screen which is used to operate the virtual image processing apparatus to the manipulation unit 42 or the computer 22 of a manipulation requester. For example, the virtual controller 34 displays the manipulation screen using a Web browser. Therefore, the user may select a desired process on the manipulation screen. As an example of a process performed on the manipulation screen, for example, a manuscript is read, Optical Character Recognition (OCR) is performed on the portions of letters, the recognized letters are converted into a format, such as a Portable Document Format (PDF), and the obtained results are uploaded to the storage service 21.

In addition, the virtual controller 34 includes a function of establishing a connection to an actual device. When the connection to the actual device is being established and another virtual image processing apparatus (virtual controller 34) has already used the actual device, it is difficult to establish connection. Therefore, the establishment of a connection is performed again after waiting for a previously determined time.

When the establishment of a connection to an actual device is in error (when it is difficult to establish a connection), the virtual controller of the corresponding virtual image processing apparatus performs a broadcast (performs an inquiry whether each virtual controller 34 is used or not) in order to find a virtual image processing apparatus which is using the actual device. Here, the virtual controller 34 which is using the actual device replies to the broadcast, and the virtual controller 34 which is awaiting the establishment of connection notifies the next use of the virtual controller 34 which is using the actual device (notifies the destinations of the actual device, which is being used, and the virtual controller 34). The virtual controller 34 manages the reservation queue of the actual device, records a request at the bottom of the reservation queue, and replies with the number of waiting. The virtual controller 34 which terminates the use of the actual device notifies the virtual controller 34 which is at the top of the reservation queue that the use of the actual device is terminated and notifies the virtual controller 34 of the content of the reservation queue. With the process as described above, the actual device may be used by another virtual controller 34 one by one.

In addition, when a connection to the actual device is established, the virtual controller 34 may provide notification to a user by instructing the blinking of the Light Emitting Diode (LED) of the actual device. After the connection to the actual device is established, the virtual controller 34 causes the virtual image processing apparatus to be operated by instructing the start of the execution of the actual device included in the selected virtual image processing apparatus. For example, a manuscript is set in an image reading apparatus in which an LED is blinking, and an execution start instruction is given, thereby operating the virtual image processing apparatus.

The virtual controller 34 receives the execution start instruction and controls the operation of the actual device. For example, when the above-described OCR process is executed, two types of manuscript reading instructions are given to the actual image reading apparatus 16. Thereafter, the actual image reading apparatus 16 reads a manuscript, and transmits image information obtained by reading the manuscript to the virtual controller 34. Thereafter, the virtual controller 34 analyzes the image of the manuscripts, extracts string information by performing OCR on the portions of letters, describes the obtained results using a format, such as a PDF, and transmits the format-converted information to the storage service 21, thus image processing results are stored in the storage service 21.

In addition, when the process performed using the actual device is terminated, the virtual controller 34 releases the connection to the actual device, changes the manipulation screen, and notifies the user that the process is terminated.

In addition, when a manipulation of closing the manipulation screen is performed by the user, the virtual controller 34 notifies the license management function 32 that the use of the actual device is terminated. The license management function 32 receives the notification and subtracts 1 from the number of uses of the actual devices. When the number of uses is 0, a single license is released. Meanwhile, when the process is executed after the manipulation screen is closed, the virtual controller 34 notifies the license management function 32 that the use of the actual device is terminated at a process termination time point.

Meanwhile, the processing target information management function 36 manages information about targets, such as an external storage service and the like, which are processed using the virtual image processing apparatus in the memory apparatus 20. For example, when an instruction to form information about a document which is stored in the memory apparatus 20 as an image using the manipulation screen which is displayed on the manipulation unit 42 or the computer 22, the processing target information management function 36 reads target information from the memory apparatus 20, and requests the actual image forming apparatus 18 included in the virtual image processing apparatus that an image be formed.

The billing function 38 includes a function of managing information about billing. For example, the billing function 38 stores the results of the use of the virtual image processing apparatus or the number of uses of services, and performs billing using such information at the time of billing.

In addition, the processed result management function 40 stores the history of results processed using the virtual image processing apparatus, and the stored information is used for a billing process performed using the billing function 38.

Continuously, a process performed by the virtual image processing system 10 according to the exemplary embodiment of the present invention, which is configured as described above, will be described.

FIG. 5 is a flowchart illustrating an example of the flow of a process performed using the manipulation unit 42 or the computer 22 of the virtual image processing system 10 according to the exemplary embodiment of the present invention.

If the manipulation unit 42 or the computer 22 is operated and it is instructed to connect to the cloud server 14, the manipulation unit 42 or the computer 22 is connected to the cloud server 14 in step 100 and the process proceeds to step 102.

In step 102, it is determined whether it is instructed to register the actual device or the virtual image processing apparatus. When the determination is affirmed, the process proceeds to step 104. When the determination is denied, the process proceeds to step 110.

In step 104, a previously determined registration screen is displayed and the process proceeds to step 106. Meanwhile, the registration screen is transmitted from the cloud computer 14.

In step 106, it is determined whether the input of registration information is terminated, the process waits until the determination is affirmed, and the process proceeds to step 108.

In step 108, the registration information is transmitted to the cloud server 14, and a series of processes are terminated. That is, consequently, information about the virtual image processing apparatus or the actual device included in the corresponding virtual image processing apparatus is registered in the cloud server 14.

Meanwhile, in the exemplary embodiment, when registration is not instructed, the process proceeds to step 110. Thereafter, the virtual image processing apparatus is used, it is requested that the cloud server 14 obtain a use situation, and the process proceeds to step 112.

In step 112, it is determined whether the use situation is obtained or not, the process waits until the determination is affirmed and the process proceeds to step 114.

In step 114, it is requested that the cloud server 14 displays a use screen, and the process proceeds to step 116. For example, when it is desirable that a copy service is used, a request that the use screen be displayed corresponds to a request that a copy screen be displayed.

In step 116, it is determined whether a license is permitted or not. The determination is performed, as the results obtained in such a way that the cloud server 14 determines license permission at the request that the use screen be obtained, in order to determine whether the license is permitted and the use screen is transmitted or the license is not permitted and an error is notified. When the determination is denied, that is, when the license is not permitted, the process proceeds to step 118. When the determination is affirmed, the process proceeds to step 120.

In step 118, since the license is not permitted, and error is displayed and a series of processes are terminated. As the display of the error, for example, an expression, such as "the number of licenses which may be used at the same time is exceeded", is displayed. Meanwhile, in the exemplary embodiment, licenses are managed within the number of actual devices which may be used at the same time. Therefore, after the use of an arbitrary actual device is terminated, if it is instructed that the actual device should be used again, the determination in step 116 is in the affirmative.

Meanwhile, in step 120, the use screen is displayed and the process proceeds to step 122. That is, hereby, the virtual image processing apparatus may be used.

In step 122, it is determined whether an execution instruction is given or not. The determination is performed to determine whether the use screen is operated and the execution of a process performed using the virtual image processing apparatus is instructed or not. The process waits until the determination is in the affirmative, and the process proceeds to step 124.

In step 124, the execution instruction is transmitted to the cloud server 14, and the process proceeds to step 126.

In step 126, it is determined whether the instruction is received. The determination is performed to determine whether it is notified that the instruction should be received using the cloud server 14. The process waits until the determination is in the affirmative, and the process proceeds to step 128.

In step 128, a connection is terminated and a series of processes is terminated. Meanwhile, although detailed description is omitted, the manipulation unit 42 or the computer 22 may confirm the completion of the execution of the virtual image processing apparatus after the virtual image processing apparatus performs the instruction.

Meanwhile, when the process using the manipulation unit 42 or the computer 22 is performed as described above, the cloud server 14 performs a process below. FIG. 6 is a flowchart illustrating an example of the flow of a process performed using the cloud server 14 of the virtual image processing system 10 according to the exemplary embodiment of the present invention.

In step 200, it is determined whether a registration instruction of the actual device or the virtual image processing apparatus is received. When the determination is affirmed, the process proceeds to step 202. When the determination is denied, the process proceeds to step 204.

In step 202, a registration process is executed and a series of processes are terminated. That is, the name of the virtual image processing apparatus included in the cloud server 14, information (for example, an IP address) about the actual device used as the corresponding virtual image processing apparatus is registered.

In addition, in step 204, it is determined whether there is a use situation request or not. That is, it is determined whether the use situation request is made by the manipulation unit 42 or the computer 22 or not in the above-described step 110. The process waits until the determination is affirmed, and the process proceeds to step 206.

In step 206, the use situation is transmitted to the requestor and the process proceeds to step 208.

In step 208, it is determined whether the manipulation screen is requested or not. The determination is to determine whether the use screen display request is made or not in the above-described step 114. The process waits until the determination is affirmed, and the process proceeds to step 210.

In step 210, it is determined whether the license is permitted or not. In the exemplary embodiment, the determination is to determine whether the licenses are used within the previously contracted number of actual devices which may be used at the same time or not using the license management function 32. When the determination is denied, the process proceeds to step 212. When the determination is affirmed, the process proceeds to step 214.

In step 212, since a condition (the number of actual devices which may be used at the same time) in which the license is permitted is not satisfied, an error is notified and a series of processes are terminated.

In step 214, since the condition in which the license is permitted is satisfied, the use screen is transmitted to the requestor and the process proceeds to step 216.

In step 216, it is determined whether the execution instruction is given or not. The determination is to determine whether the execution instruction is transmitted or not in the above-described step 124, the process waits until the determination is affirmed, and the process proceeds to step 218.

In step 218, the use of the actual device is checked and the process proceeds to step 220. That is, the virtual controller 34 of the virtual image processing apparatus of a use target checks whether the virtual controller 34 of another virtual image processing apparatus uses the actual device of the use target in a broadcast manner.

In step 220, it is determined whether the actual device may be used or not. As the result of step 218, the determination is to determine whether the actual device may be directly used or not without using the actual device for another purpose. When the determination is denied, the process proceeds to step 222. When the determination is affirmed, the process proceeds to step 226.

In step 222, the use of the actual device is reserved with respect to the virtual controller 34 of the virtual image processing apparatus which is being used, and the process proceeds to step 224. In step 224, it is determined whether a notification that the use of the actual device which is being used by another virtual image processing apparatus is terminated is received or not. The process waits until the determination is affirmed, and the process returns to the above-described step 220. Therefore, the above-described process is repeated.

In addition, in step 226, a process instructed using the manipulation unit 42 or the computer 22 is executed and a series of processes are terminated. Meanwhile, although the detailed description is omitted, when the completion of the execution of the virtual image processing apparatus is checked using the manipulation unit 42 or the computer 22 after the instruction of the virtual image processing apparatus is executed, whether the execution is completed or not may be replied.

Next, the detailed operation of the virtual image processing system 10 according to the exemplary embodiment of the present invention will be described using an example.

FIG. 7 is a timing chart illustrating an example of an operation performed when a user A uses the copy service of the virtual image processing apparatus A46*a* in the virtual image processing system 10 according to the exemplary embodiment of the present invention.

First, a user A connects to the cloud server 14 via the communication unit 12 using the manipulation unit 42 or the computer 22. Thereafter, the user A obtains the use situation of the virtual image processing apparatus A46*a*.

The virtual controller 34 of the virtual image processing apparatus A46*a* transmits the use situation at the use situation obtainment request of the user A.

Continuously, the user A gives the controller 34 of the virtual image processing apparatus A46*a* a copy screen display instruction. When the instruction is received, the license of the virtual image processing apparatus A46*a* is checked using the license management function 32. In the example shown in FIG. 7, an example, in which the licenses of the actual image reading apparatus A16*a* and the actual image forming apparatus A18*a* are checked and OK (use permission) is notified using the license management function 32, is shown.

The virtual controller 34 of the virtual image processing apparatus A receives use permission and outputs the copy screen to the user A. Therefore, the copy screen is displayed on the manipulation unit 42 or the computer 22 of the user A.

The user A gives the virtual image processing apparatus A46*a* a process execution instruction by manipulating the copy screen, and the virtual controller 34 of the virtual image processing apparatus A46*a* notifies the reception of the instruction. Thereafter, in the example shown in FIG. 7, the user A closes the manipulation screen and terminates the connection.

The virtual controller 34 of the virtual image processing apparatus A46*a* checks the use of an actual device by broadcasting the virtual image processing apparatus B46*b* and another virtual image processing apparatus. Here, when the actual device is not used by another apparatus, a copy process is executed using the actual device according to the instruction from the manipulation screen, and the process is terminated.

When the process is terminated, the virtual controller 34 of the virtual image processing apparatus A46*a* notifies the license management function 32 of the release of the license of the actual device (in FIG. 4, the actual image reading apparatus A16*a* and the actual image forming apparatus A18*a*). The license management function 32 receives the notification and subtracts 1 from the number of uses of the notified actual device. At this time, when the number of uses is 0, a single license is released and the use is restricted.

When the reply to the release of the license is received, the virtual controller 34 of the virtual image processing apparatus A46*a* may notify the user A of the termination.

The user A connects to the virtual image processing apparatus A46*a*, makes a use situation obtainment request. The virtual controller 34 of the virtual image processing apparatus A46*a* replies to the request and transmits the use situation. The user A checks a normal termination, and the process is terminated.

Next, an example of the operation of the virtual image processing system 10 when a user B tries to execute the copy process of virtual image processing apparatus B46*b* and a license is not sufficient will be described, FIG. 8 is a timing chart illustrating an example of an operation performed when the user B tries to use the copy service of the virtual image processing apparatus B46*b* but a license is not sufficient in the virtual image processing system 10 according to the exemplary embodiment of the present invention.

The user B connects to the cloud server 14 via the communication unit using the manipulation unit 42 or the computer 22. Thereafter, the user B obtains the use situation of the virtual image processing apparatus B46*b*.

The virtual controller 34 of the virtual image processing apparatus B46*b* transmits the use situation at the use situation obtainment request of the user B.

Continuously, the user B gives the virtual controller 46*b* of the virtual image processing apparatus B46*b* a copy screen display instruction. When the instruction is received, the virtual image processing apparatus B46*b* causes the license management function 32 to check the license. Since the license is not sufficient, non-permission of use (NG) is transmitted to the license management function 32. The virtual image processing apparatus B46*b* receives the NG and displays an error on the manipulation unit 42 or the computer 22 of the user A. For example, a message "insufficient license" is displayed.

Continuously, the case in which the user A uses the virtual image processing apparatus A46*a* which includes the actual image reading apparatus A16*a* and the actual image forming apparatus A18*a* and the user B uses the virtual image processing apparatus B46*b* which includes the actual image reading apparatus B16*b* and the actual image forming apparatus A18*a* (a case in which the same actual device is used) will be described.

Figure 10:
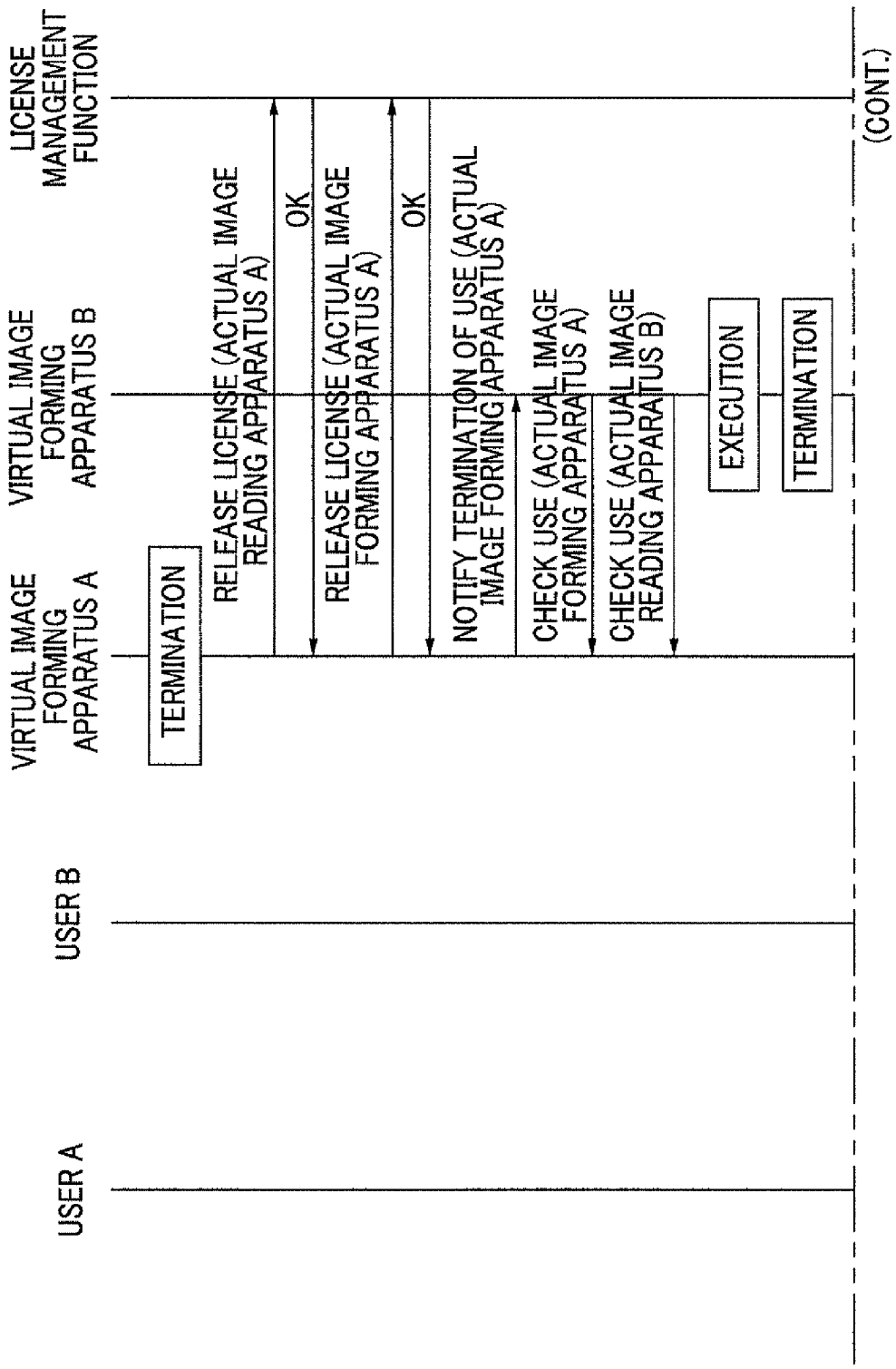
FIG. 10 is a timing chart illustrating an example of (the latter half of) the operation performed when the user A and the user B use the same actual device with different virtual image processing apparatuses in the virtual image processing system according to the exemplary embodiment of the present invention.

FIGS. 9 and 10 are timing charts illustrating an example of an operation performed when the user A and the user B use the same actual device with different virtual image processing apparatuses in the virtual image processing system 10 according to the exemplary embodiment of the present invention.

The user A gives the virtual controller 34 of the virtual image processing apparatus A46*a* a copy screen display instruction. When the instruction is received, the virtual image processing apparatus A46*a* causes the license management function 32 to check a license. The example shown in FIG. 9 shows an example in which the licenses of the actual image reading apparatus A16a and the actual image forming apparatus A18a are checked and OK (use permission) is notified by the license management function 32.

The virtual controller 34 of the virtual image processing apparatus A46a receives the use permission and outputs the copy screen to the user. Therefore, the copy screen is displayed on the manipulation unit 42 or the computer 22 of the user A. Accordingly, the user A may set the use of the virtual image processing apparatus A using a display screen.

In addition, the user B connects to the cloud server 14 using the manipulation unit 42 or the computer 22 via the communication unit 12. Thereafter, the copy screen display instruction is given to the virtual controller 34 of the virtual image processing apparatus B46b.

The virtual controller 34 of the virtual image processing apparatus A46a causes the license management function 32 to check a license. The example shown in FIG. 9 shows an example in which the licenses of the actual image reading apparatus B16b and the actual image forming apparatus A18a are checked and OK (use permission) is notified by the license management function 32.

The virtual controller 34 of the virtual image processing apparatus B receives the use permission and the copy screen is output to the user B. Therefore, the copy screen is displayed on the manipulation unit 42 or the computer 22 of the user B. Therefore, the user B may set the use of the virtual image processing apparatus A using the display screen.

Meanwhile, when the user A sets the use of the virtual image processing apparatus A46a and instructs it to execute the virtual image processing apparatus A46a, the virtual controller 34 of the virtual image processing apparatus A46a checks whether the virtual image processing apparatus B46b uses the actual image reading apparatus A16a and the actual image forming apparatus A18a (it is checked whether another virtual image processing apparatus uses the actual image reading apparatus A16a and the actual image forming apparatus A18a in a broadcast manner). Thereafter, if it is checked that the virtual image processing apparatus does not use the actual image reading apparatus A16a and the actual image forming apparatus A18a, the virtual image processing apparatus A46a performs a process instructed by the user A.

Continuously, when the user B sets the use of the virtual image processing apparatus B46b and instructs it to execute the virtual image processing apparatus B46b, the virtual image processing apparatus B46b transmits an instruction reception notification to the user B, and the user B checks the notification and terminates the connection.

The virtual image processing apparatus B46b checks whether the virtual image processing apparatus A46a uses the actual image reading apparatus B16b and the actual image forming apparatus A18a (it is checked whether another virtual image processing apparatus uses the actual image reading apparatus B16b and the actual image forming apparatus A18a in a broadcast manner). In the case of this example, the virtual controller 34 of the virtual image processing apparatus A46a notifies the virtual controller 34 of the virtual image processing apparatus B46b that the actual image forming apparatus A18a is being used.

When the virtual image processing apparatus B46b receives the notification that the actual image forming apparatus A18a is being used, the virtual image processing apparatus B46b outputs the use reservation to the virtual controller 34 of the virtual image processing apparatus A46a.

Continuously, description proceeds to FIG. 10. When the process of the virtual image processing apparatus A46a is terminated at the request of the user A, the virtual controller 34 of the virtual image processing apparatus A46a notifies the license management function 32 of the release of licenses of the actual devices (the actual image reading apparatus A16a and the actual image forming apparatus A18a in FIG. 10). The license management function 32 receives the notification, and subtracts 1 from the number of uses of the notified actual devices. At this time, when the number of uses is 0, a single license is released.

When the virtual controller 34 of the virtual image processing apparatus A46a receives a reply to the release of the license from the license management function 32, and provides a notification of the termination of the use of the actual image forming apparatus A18a to the virtual controller 34 of the virtual image processing apparatus 1346b. Therefore, the virtual controller 34 of the virtual image processing apparatus B46b checks whether the virtual image processing apparatus A46a uses the actual image reading apparatus B16b and the actual image forming apparatus A18a based on the instruction from the user A (checks whether another virtual image processing apparatus uses the actual image reading apparatus B16b and the actual image forming apparatus A18a in a broadcast manner). Thereafter, when it is checked that the actual device is not used by another virtual image processing apparatus, a process is executed based on the instruction from the user B and the process is terminated.

When the process instructed by the user B is terminated, the virtual image processing apparatus B46b notifies the license management function 32 of the release of the licenses of the actual devices (the actual image reading apparatus B16b and the actual image forming apparatus A18a in FIG. 10). The license management function 32 receives the notification, and subtracts 1 from the number of uses of the notified actual devices. At this time, when the number of uses is 0, a single license is released.

Thereafter, the user A and the user B connects to the respective virtual image processing apparatuses 46a and 46b which request the process, and request the obtainment of the use situation. The virtual controllers 34 of the respective virtual image processing apparatuses 46a and 46b transmit the use situation at the request. Each of the users recognizes normal termination, and the process is terminated.

Meanwhile, each of the processes shown in FIGS. 5 and 6 in the exemplary embodiment may be a process performed using hardware or may be a software process performed by executing a program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus, comprising:
a provision unit that is connected to a communication unit used to communicate with a plurality of actual apparatuses which perform previously determined processes requiring a license and a manipulation unit which is used to manipulate the actual apparatuses, that forms virtual image processing functions which control operations of the actual apparatuses based on manipulation of the manipulation unit, and that provides services using the virtual image processing functions, wherein the provision unit is stored on a server that is communicable with the actual apparatuses over a network so that the provision unit is separate from the actual apparatuses; and a control unit on the server that, when an operation execution instruction of the actual apparatuses is given using the manipulation unit via the communication unit, allows the processes requiring a license to be executed but limits the processes which exceed an amount of licenses indicating a previously contracted number of actual apparatuses which may be executed at a same time, throughputs of the previously contracted number of actual apparatuses which may be executed at the same time, or a previously contracted number of virtual image processing functions which may be executed at the same time, and that controls the provision unit such that the services are provided based on the operation execution instruction.

2. The processing apparatus according to claim 1, wherein the provision unit forms the plurality of virtual image processing functions, and provides the services using the respective virtual image processing functions, and wherein, when the operation execution instruction is given, the control unit searches for a use state of a use target actual apparatus, and, when the actual apparatus corresponding to the use target is being used by another virtual image processing function, performs control such that the provision unit makes a use reservation, waits until the another processing apparatus terminates the use of the actual apparatus corresponding to the user target, and provides the services.

3. A processing system, comprising:

the processing apparatus according to claim 1, the actual apparatuses that are connected to the communication unit, and that perform previously determined processes based on the control of the provision unit; and the manipulation unit that is connected to the communication unit and used to manipulate the actual apparatuses.

4. A processing system, comprising:

the processing apparatus according to claim 2, the actual apparatuses that are connected to the communication unit, and that perform previously determined processes based on the control of the provision unit; and the manipulation unit that is connected to the communication unit and used to manipulate the actual apparatuses.

5. A non-transitory computer readable medium storing a program causing a computer to function as the control unit of the processing apparatus according to claim 1.

6. A non-transitory computer readable medium storing a program causing a computer to function as the control unit of the processing apparatus according to claim 2.

* * * * *